United States Patent [19]

Grier

[11] 3,920,642

[45] Nov. 18, 1975

[54] OXAZINIUM SALTS

[75] Inventor: Nathaniel Grier, Englewood, N.J.

[73] Assignee: Merck & Co., Inc., Rahway, N.J.

[22] Filed: June 25, 1973

[21] Appl. No.: 373,063

Related U.S. Application Data

[63] Continuation-in-part of Ser. No. 71,408, Sept. 11, 1970, abandoned.

[52] U.S. Cl. ....... 260/244 R; 260/211.5 R; 424/190; 424/248
[51] Int. Cl.² ................ C07D 265/06; C07H 19/02
[58] Field of Search .......................... 260/244, 211.5

[56] References Cited
UNITED STATES PATENTS 2,647,117   7/1953   Hartaugh et al. .................... 260/244

*Primary Examiner*—Harry I. Moatz
*Attorney, Agent, or Firm*—Edmunde D. Riedl; J. Jerome Behan

[57] ABSTRACT

Tetrahydro-1,3-oxazinium quaternary salts are prepared from tetrahydro-1,3-oxazine and N-substituted tetrahydro-1,3-oxazine compounds. The tetrahydro-1,3-oxazinium quaternary salts are susceptible to metathesis with metallic salts of anionic radicals. The above quaternary salts possess antimicrobial activity.

6 Claims, No Drawings

OXAZINIUM SALTS

This application is a continuation-in-part application of Ser. No. 71,408, filed Sept. 11, 1970 and now abandoned.

Summary of the Invention

This invention relates to antimicrobial compounds, processes for the preparation thereof and compositions utilizing said compounds as antimicrobial agents. More specifically, this invention relates to tetrahydro-1,3-oxazinium quaternary compounds prepared from the N-substituted and N-unsubstituted tetrahydro-1,3-oxazinium free base.

Description of the Invention

The 1,3-oxazinium quaternary compounds of this invention may be shown by the following structural formula:

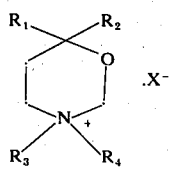

wherein $R_1$ is a planar aromatic substituent which may be an aromatic hydrocarbon or a heteroaromatic group, which may be optionally substituted. Exemplary of the aforementioned are phenyl or substituted phenyl; and heteroaromatic groups such as pyridyl, pyrazinyl, thienyl and substituted variations thereof. Appropriate ring substituents are: loweralkyl, loweralkoxy, phenyl, benzyl, halogen, nitro, amino, monoloweralkylamino, diloweralkylamino, hydroxyl, mercapto, loweralkoxyloweralkyl and loweralkanoyloxyloweralkyl.

$R_2$ is hydrogen, loweralkyl, loweralkoxy; hydroxyloweralkyl and derivatives thereof such as loweralkyl ethers and loweralkanoyl esters as well as thio analogs thereof such as mercapto loweralkyl, and derivatives such as loweralkyl thioethers and loweralkanoyl thioesters; phenyl or loweralkyl phenyl.

$R_3$ is loweralkyl.

$R_4$ is alkyl containing from 8 to 20 carbon atoms; aralkyl such as benzyl or phenethyl and substituted analogs thereof in which the substituent may be halogen, nitro, loweralkyl, amino, monoloweralkylamino, diloweralkylamino, hydroxyloweralkyl and derivatives thereof such as loweralkoxyloweralkyl and loweralkanoyloxyloweralkyl.

X is any inorganic or organic anion such as halo, hydroxyl, nitrate, sulfate, phosphate, borate, alkyl sulfate such as methylsulfate, ethylsulfate or laurylsulfate; alkoxyloweralkyl sulfate in which the alkoxy group contains from 8 to 20 carbon atoms such as methoxymethylsulfate; alkylhydrogenphosphates such as lauryl acid phosphate; alkylbenzene sulfonates such as dodecylbenzene sulfonate; carboxylic acid anions of from 1 to 20 carbon atoms; anions derived from nitrogen compounds which are possessive of a proton which has been activated to render it acidic such as saccharinate, sulfonamides such as phenylsulfonamide, and derivatives thereof such as loweralkylphenyl sulfonamides.

In this application when reference is made to "lower" referring to the length of a particular organic chain, what is meant is that the length of the carbon chain, exclusive of any hetero atoms is from 1 to 4. Thus, "loweralkyl" is methyl, ethyl, propyl, butyl and branched isomers thereof; "loweralkoxy" is methoxy, ethoxy, tert-butoxy and the like; "loweralkanoyl" is acetyl, propionyl, butyryl and the like; "loweralkanoyloxy" is acetate, propionate, butyrate or isobutyrate; and "loweralkyl carboxylic acid" includes formic, acetic, propionic, butyric, and isobutyric acids. The term "alkyl" refers to a carbon chain possessive of from 1 to 20 carbon atoms.

When reference is made in this application to a "substituted phenyl group" or "substituted cycloheteroaromatic group" all of the possible isomers are to be included in the definition. For example, for 6 membered rings, the ortho, meta, and para isomers are all deemed to be included. By "halogen" or "halo" is meant the atoms fluorine, chlorine, bromine, and iodine.

Preferred Embodiments of the Invention

The preferred embodiments of this invention may be found in those compounds in which $R_1$ is phenyl, $R_2$ is loweralkyl, $R_3$ is alkyl of from 9 to 12 carbon atoms, $R_4$ is loweralkyl, and X is halo. Specific exemplary compounds are 3,6-dimethyl-3-(n-decyl)-6-phenyltetrahydro-1,3-oxazinium bromide; 3,6-dimethyl-3-(n-dodecyl)-6-phenyltetrahydro-1,3-oxazinium bromide; 3-(n-decyl)-6-ethyl-3-methyl-6-phenyltetrahydro-1,3-oxazinium chloride; 3,6-diethyl-3-(n-undecyl)-6-phenyltetrahydro-1,3-oxazinium iodide; 6-(n-butyl)-3-(n-decyl)-6-methyl-3-phenyltetrahydro-1,3-oxazinium bromide; and the like.

It is to be noted that the preferred embodiments of this invention are formed of a rather surprising array of compounds with respect to one of the substituents at the quaternary nitrogen. The longer alkyl chain is seen to extend from 8 to 20 carbon atoms with 9 to 12 carbon atoms being of preference. The activity of these compounds is maximized in this range. The activity falls off above and especially below this range. Below a carbon chain length of 8, the activity is negligible. Thus, the compounds of this invention are surprisingly active and the activity would not be discovered by examining compounds in which all else was constant in the molecule, but where the chain length was reduced to, for example, loweralkyl. The reason for this peculiar phenomenon may be due to the geometry imparted into the molecule by the substituents as hereinbelow explained.

Process of the Invention

The process used in the preparation of the compounds of this invention may be shown in the following flow chart.

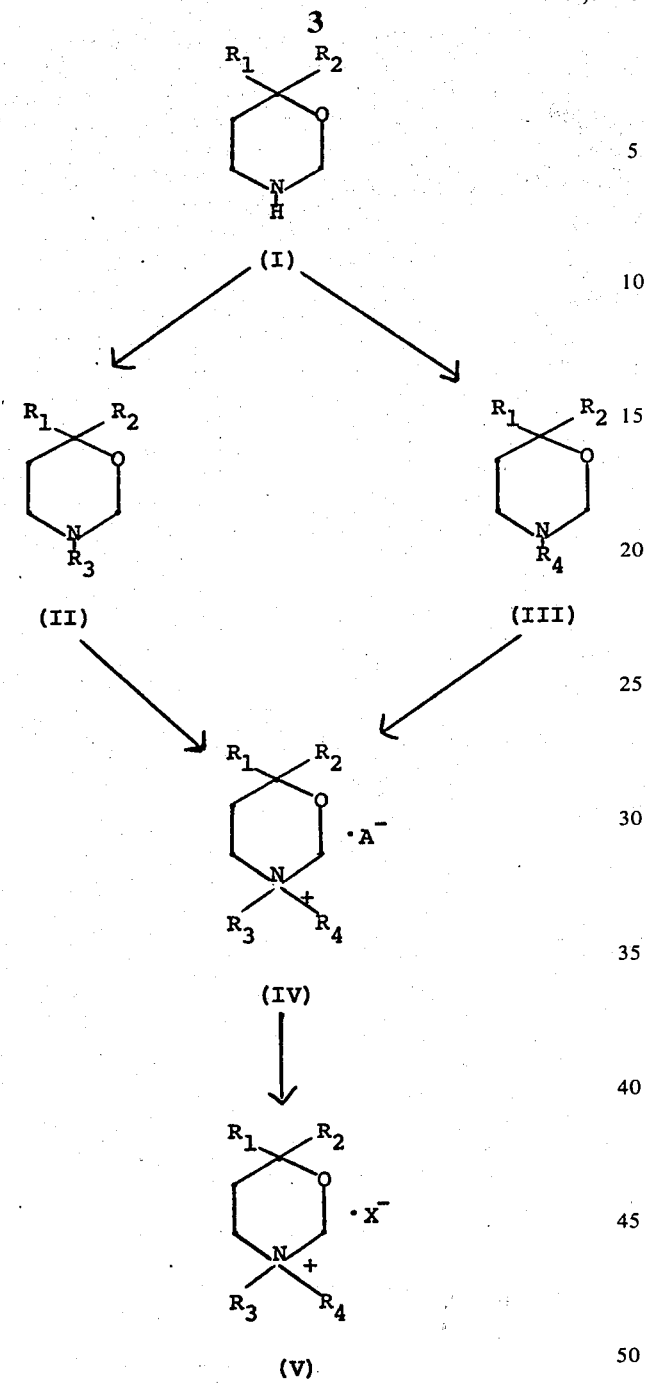

wherein $R_1$, $R_2$, $R_3$, $R_4$ and X are as previously defined and A is a halogen.

The 6,6-disubstituted tetrahydro-1,3-oxazine free base (I) is prepared from appropriately substituted starting materials by methods known to those skilled in the art. One known method involves the use of an alkylene compound, an ammonium salt and a source of formaldehyde to produce the compounds of formula I.

Compound I can be reacted with an appropriately substituted alkylating agent to form compounds II and III. Suitable alkylating agents have been found to be $R_3$ or $R_4$ substituted halides, sulfates, sulfonates and the like. Subsequent to the combination of the alkylating agent and compound I, the intermediate complex is contacted with a base to liberate the 3-$R_3$ or $R_4$ substituted tetrahydrooxazine free base, compounds II and III, respectively. The bases used for the neutralization which have been found to be of preference are alkali metal and alkaline earth metal, alkoxides, hydroxides, carbonates or bicarbonates. Specific bases which have proved to be superior are sodium ethoxide, sodium methoxide, sodium hydroxide, potassium carbonate, clacium carbonate, sodium bicarbonate, calcium hydroxide, and the like. The reaction is preferably run in a solvent inert to reaction by either the starting materials or the base. When the base is an alkoxide, the solvent of preference is a loweralkanol of up to 4 carbon atoms. When the inorganic bases are used, they are utilized in solution or suspension and the solvent may be a lower-alkanol, a lower ketone, an aromatic hydrocarbon of up to 8 carbon atoms, or a halogenated hydrocarbon. The reaction is often a two phase reaction in those cases where the inorganic base is not appreciably soluble in the organic solvents. However, no deterioration of yields has been noticed when the reaction is inhomogeneous. The reaction is run at a temperature of from room temperature to the reflux temperature of the solvent employed for a duration of from 1 to 24 hours. The $R_3$ or $R_4$ substituted intermediate is isolated by techniques known to those skilled in the art such as solvent evaporation and crystallization or distillation.

The quaternization of compounds II and III utilizes either $R_3$ or $R_4$ substituted halides. The choice depends on the substituent already present on the oxazine nucleus. When the $R_3$ substituted compound is being quaternized, an $R_4$ substituted halide is used; and analogously an $R_3$ substituted halide is used to quaternize an $R_4$ substituted oxazine. The reaction is preferably carried out under anhydrous conditions at a temperature of from 20° to 125°C. Although a solvent is not necessary, and satisfactory results are obtained without one, it has been found that improved results are obtained if a solvent is used. Preferred solvents are lower alkanols such as ethanol and isopropanol, lower ketones such as acetone; lower ethers and diethers such as diethyl ether and 1,2-dimethoxy ethane; aromatic hydrocarbons of up to 8 carbon atoms, such as benzene or toluene; and the like. It is often advantageous to utilize mixtures of solvents. In some cases, one of the reactants may be used as the solvent. If the organic halide which is being used to quaternize the oxazine is readily available, and is a liquid, it may be used as a solvent in itself by utilizing it in excess of the other reagents. Generally, a 5 to 50 molar excess will suffice. If the halide is a solid at room temperature, but liquifies at the temperature at which the reaction is to be run, a liquid fusion reaction may be utilized. In general, a single molar equivalent up to a 10 molar excess of the halide will suffice to provide a suitable fusion. The product is separated from the reaction mixture or solution by techniques known to those skilled in the art. Evaporation of solvents and recrystallization of the residues is generally preferred for solvent reactions, and solvent washing and recrystallization are preferred for non-solvent reactions. The quaternary salts are generally more soluble in polar solvents and the starting materials are generally more soluble in non-polar solvents. Thus, isolation may be readily achieved by washing the residue or fusion with a non-polar solvent such as ether, benzene or carbon tetrachloride, and recrystallizing the residue from a polar solvent. Non-polar solvents preferable for the above washing have been found to be ethers, hydrocarbons, and halogenated hydrocarbons, such as diethyl ether, hexane, and chloroform, respectively. Polar solvents preferable for recrystallization have been found to be water or alcohols and ketones such as ethanol and acetone, respectively.

The quaternary salts as obtained by the above reaction sequence are restricted to A being halogen. However, often it is desirable to produce compounds in which the anion is other than a halogen or a different halogen. To achieve this change in the anionic component of compound IV, a metal salt of an inorganic acid, such as sulfuric, nitric, or phosphoric acids; an organic lower carboxylic acid such as formic, acetic, propionic, or butyric acids; or any organic compound which possesses a proton replaceable by said metal, such as saccharin and the like, is employed in a metathesis or anionic exchange reaction. The metal is preferably an alkali metal or an alkaline earth metal such as sodium, potassium, calcium and the like. The metathesis reaction is carried out in either a polar or a non-polar solvent such as water; lower-alkanols such as ethanol; lower ketones such as acetone; lower ethers such as diethylether; aromatic hydrocarbons of up to 8 carbon atoms such as benzene; and lower amides such as formamide or N,N-dimethyl formamide. Mixtures of solvents are often useful, such mixtures being selected from those solvents which are miscible with each other. The reaction is run at a temperature of from 0° to 150°C. with the range of from 50° to 100°C. being preferred. The duration of the reaction is from 1 to 24 hours, although generally the reaction is complete in from 2 to 10 hours.

Owing to their antibacterial activity, the tetrahydro-1,3-oxazinium quaternary salts of this invention find application in a variety of aqueous systems when formulated with suitable carriers which are to be added to the system requiring antimicrobial protection.

The n-decyl compound, [3,6-dimethyl-3-(n-decyl)-6-phenyltetrahydrooxazinium bromide], when tested in vitro against several gram-negative bacteria showed marked inhibition at the lowest concentration level tested, 100γ/ml. Included in the tests were bacteria of the types *E. coli*, *Proteus vulgaris*, *Salmonella schottmuelleri*, and *Pseudomonas aeruginosa*.

When the n-decyl compound is compared with hexachlorophene in an antimicrobial screen, the n-decyl compound is shown to have a minimum inhibitory concentration of 10 parts per million against *Aerobacter aerogenes* while hexachlorophene is shown to have a minimum inhibitory concentration of 250 parts per million against the same microorganism. Other known antimicrobial agents such as benzalkonium chloride, and cetylpyridinium chloride require from 200 to 550 parts per million to inhibit *Aerobacter aerogenes* thus showing the superiority of the compounds of this invention.

In the coatings industry, which is expanding its use of water based systems, agents which will prevent microbial growth therein are desired. Aqueous coatings based on acrylic, butadiene-styrene, and polyvinyl acetate polymers and co-polymers have a tendency to undergo bacterial fermentation during prolonged storage. The coatings also usually contain thickeners based on cellulose derivatives, casein and lecithin, film plasticizers, coalescents, stabilizers, dispersants, and salts, all of which tend to support or promote bacterial growth. Bacterial growth is noted in untreated coatings by the formation of a foul odor, a loss of viscosity, pH change, gas evolution, and colloid breakdown. This makes the coating no longer suitable for the use for which it was intended and is a cause of great deal of storage losses within the coatings industry.

Other similar aqueous systems susceptible to microbial attack, against which tetrahydro-1,3-oxazinium quaternary salts are useful are: pigment dispersions, adhesives, cutting oil emulsions in water, and sizings for textiles and paper products. The active ingredients can be added to the above aqueous systems at concentrations capable of inhibiting bacterial growth. These concentrations have been such that the desirable characteristics of the aqueous system were not interfered with. Effective concentrations are found in the range of 0.005 to 1.0% of the compound in the aqueous systems by weight.

Incorporation of 0.5 to 2.5 lbs. of the tetrahydrooxazinium salts into 100 gallons of finished coating or other aqueous system serves to protect said coatings against microbial attack. The tetrahydrooxazinium salts can be added to the aqueous system at any stage of development with equal success. The salt can be added as a solid with the pigments, or other solid additives, in aqueous solution to the aqueous carrier, or as a solid or concentrated aqueous solution to the finished coating or other aqueous system.

Aqueous systems in the paper making industry such as white water, and recirculating cooling systems in which slimes have a tendency to form, are successfully treated with tetrahydro-1,3-oxazinium quaternary salts. The formation of slimes by microorganisms in water systems of paper mills causes serious economic losses. These slimes, if allowed to accumulate on the walls of equipment used to produce paper, may become detached, integrate themselves into the furnish and then into the finished paper. These slimes weaken the paper and cause it to tear in the paper machines with resultant production losses. The slimes also result in accelerated corrosion of machinery, darkening of pulps, strong odor, and an overall reduction in the quality of paper produced. Such slime problems can be alleviated by the addition to the furnish of from 5 to 500 ppm. of a quaternary tetrahydrooxazinium salt. The addition can be by means of an aqueous solution, non-aqueous water miscible solution or as a solid. The addition can be either portionwise or continuous with equivalent results in either case.

Slimes cause similar problems to the equipment in cooling water circulation systems. The addition of quaternary tetrahydrooxazinium salts in a similar fashion as in paper mill white water at a concentration of from 5 to 500 ppm. results in a considerable decrease in bacterial count.

In the paper mill white water system the activity of the compounds can be demonstrated by the following charts in which the test system is an aqueous pulp suspension similar to paper mill furnish.

| Untreated System (Aerobacter aerogenes) | |
| --- | --- |
| Time Following Infection | Population Density (per ml.) |
| 1 hr. | $4.9 \times 10^7$ |
| 4 hrs. | $1.1 \times 10^8$ |
| 24 hrs. | $>3 \times 10^8$ |

Treated System

[Aerobacter aerogenes and 3,6-dimethyl-3-(n-decyl)-6-phenyltetrahydrooxizinium bromide]

| Time Following Infection and Treatment | Percent Reduction in Population at an Initial Concentration of: | | | |
| --- | --- | --- | --- | --- |
| | 50 ppm. | 25 ppm. | 10 ppm. | 5 ppm. |
| 1 hr. | >99.99 | >99.99 | 99.9 | 99.9 |

Treated System-continued

[Aerobacter aerogenes and 3,6-dimethyl-3-(n-decyl)-6-phenyltetrahydrooxizinium bromide]

| Time Following Infection and Treatment | Percent Reduction in Population at an Initial Concentration of: | | | |
|---|---|---|---|---|
| | 50 ppm. | 25 ppm. | 10 ppm. | 5 ppm. |
| 4 hrs. | >99.99 | >99.99 | >99.99 | >99.99 |
| 24 hrs. | 99.99 | <99 | <99 | <99 |

As can be seen, the n-decyl compound is capable of preventing the growth of the microorganism over a wide range of concentrations and over a prolonged period of time. There is seen to be only 0.1% of the bacterial population present 24 hours after a single treatment of the active compound at a concentration of 50 ppm. The duration and extent of the activity of the compounds of this invention particularly suits them for use in paper mill white water.

The carriers with which the compounds of this invention may be admixed for addition to the aqueous system requiring treatment are water soluble materials or materials colloidally mixable or suspendable in water. The composition is often added to the system to be protected in the form of a premix which may be either a liquid concentrate or solid additive. In a premix the concentration of the active ingredient is from 5% to 75% with from 10% to 50% being preferred. In addition to the active compound, the premix contains suitable carriers, stabilizers, binders, or emulsifiers as the particular system, in which it is to be used, demands. A concentrated solution of the active ingredient in water with water soluble dispersing agents is often desired. The premix is then added to the system to be protected such that the final concentration of the active compound is from 0.005 to 1.0% by weight.

Another use of the compounds of the invention is found in their pharmaceutical use as a topical or oral antibacterial agent. Topically the compounds of the instant invention, when combined with a suitable carrier and applied to the skin at concentrations as low as 10 parts per million, are seen to retard the growth of microorganisms commonly found on the skin. The common undesirable effect of serum inactivation is not noticed as explained hereinbelow. Typical formulations applicable for topical use are creams, ointments, lotions, solutions and the like, the preparation of which is well known to those skilled in the pharmaceutical art.

As an oral antibacterial agent, the compounds of this invention have been found to inhibit the formation of dental plaque when applied at concentrations as low as 0.05% in a suitable carrier. When rats are given drinking water treated with one or more tetrahydro-1,3-oxazinium quaternary salts at a concentration of 0.05% it was observed that there was no formation of dental plaque as opposed to similar animals given untreated water, which all developed some dental plaque. The same results were observed when all of the animals were fed a cariogenic diet, one rich in sucrose, tending toward the formation of caries.

The antibacterial activity of these tetrahydro-1,3-oxazinium quaternary salts is surprising as to its extent and especially its duration. The expected result for a normal antibacterial compound is that some serum inactivation will result. Normally, whenever a quaternary antibacterial agent comes in contact with any proteinaceous material, the activity of the agent is immediately lessened. In many of the systems for which the compounds of this invention have application, there is present a certain amount of proteinaceous material. This is true in the paper and coatings applications especially. The compounds of this invention have been found to maintain their antibacterial and antifungal activity whether or not any proteinaceous material is present. Thus, while other antibacterial and antifungal agents have been inactivated, the compounds of this invention are still possessive of antibacterial and antifungal activity. This provides for a longer allowable storage life for the protected system than would be normally allowed, and simultaneously a reduction of losses incurred during storage.

The resistance of the compounds of the instant invention to inactivation by serum is seen in the following chart where 3,6-dimethyl-6-phenyltetrahydro-1,3-oxazinium bromide is tested for its ability to control the microorganism Staphylococcus aureus in the presence of varying concentrations of serum.

| 3,6-Dimethyl-6-Phenyltetrahydro-1,3-Oxazinium Bromide | |
|---|---|
| Serum | Staphylococcus aureus Minimum Inhibitory Concentration (mcg/ml) |
| 0 | 4.0 |
| 0.1 | 4.0 |
| 0.5 | 4.0 |
| 1.0 | 4.0 |
| 5.0 | 4.0 |
| 10.0 | 6.0 |

The effect of serum on the antibaterial activity of 3,6-dimethyl-6-phenyltetrahydro-1,3-oxazinium bromide, a representative compound of the series, is seen to be non-existant to a serum concentration greater than 5%. At a serum concentration of 10% the minimum inhibitory concentration is seen to be increased to 6.0 mcg/ml, an increase of 50% from 0% serum concentration. Thus, the effect of serum on the oxazinium quaternary salts of this invention is remarkably small, especially considering the effect of serum on other antibacterial agents. Other antibacterial agents, when tested for serum inactivation against the same microorganism, are seen to require a much greater increase in the minimum inhibitory concentration. Cetyl pyridinium chloride (1-hexadecylpyridinium chloride) and cetrimide (1-hexadecyltrimethyl ammonium bromide) are much more susceptible to serum inactivation.

Cetyl pyridinium chloride requires a seven-fold increase in order to maintain the minimum inhibitory concentration in the range of from 0% to 10% serum concentration; cetrimide requires a fifteen-fold increase in concentration in the range of from 0% to 10% serum, and while there is no serum inactivation noted for the compound of the instant invention in the range of 0% to 5% serum, cetyl pyridinium chloride and cetrimide have a seven-fold and ten-fold increase respectively in the minimum inhibitory concentration. This characteristic renders the compounds of this invention particularly suitable for uses where a resistance to serum inactivation is required.

One possible explanation of this unusual but desirable phenomenon may be in the geometry of the tetrahydro-1,3-oxazinium quaternary salt. The tetrahydro oxazinium nucleus, when substituted with a phenyl or other bulky planar group at the 6-position and with a long chain alkyl group on the quaternary nitrogen, is oriented to provide for a freedom from interaction between the proteinaceous material and the quaternary nitrogen. Heretofore, quaternary compounds have been observed to interact with any proteinaceous material, such as serum, and to be removed from the biologically active site resulting in an inactivation of the compound. The serum inactivation tends to prevent the compound from serving as an antibacterial or antifungal agent. Because of the aforementioned geometry of the molecule, tetrahydro-1,3-oxazinium quaternary salts do not promote any interactions between the protein and the quaternary nitrogen.

The foregoing theory is presented as a possible explanation of an observable phenomenon in order to make the invention more understandable. It is a theory subject to interpretation and change and is not a limitation of the instant invention.

The following examples are also presented so that the invention might be more fully understood and are not to be construed as limitations of the invention.

EXAMPLE 1

3,6-Dimethyl-3-(1-n-octyl)-6-phenyltetrahydro-1,3-oxazinium bromide 3.7 G. (0.019 m.) of 3,6-dimethyl-6-phenyltetrahydro-1,3-oxazine and 10 g. (0.05 m.) of 1-bromo-n-octane are combined in 10 ml. of acetone and heated to reflux for 5 hours, after which the reaction mixture is allowed to stand for 16 hours at 20°C. The product, which crystallizes during this period, is removed by filtration and is washed with cold acetone (100 ml.) and diethyl ether (100 ml.). The 3,6-dimethyl-3-(n-octyl)-6-phenyltetrahydro-1,3-oxazinium bromide is recrystallized from 150 ml. of acetone recovering 2.0 g. of product melting at 197° to 198.5°C.

In a similar manner as above, employing 1-bromo-n-nonane instead of 1-bromo-n-octane, there is obtained 3,6-dimethyl-3-(n-nonyl)-6-phenyltetrahydro-1,3-oxazinium bromide, recrystallizable from acetone and melting at 192° to 192.5°C.

When in the above procedure 1-chloro-n-octane, 1-chloro-n-nonane, or 1-chloro-n-decane is employed in place of 1-bromo-n-octane there is obtained 3,6-dimethyl, 3-(n-octyl)-6-phenyltetrahydro-1,3-oxazinium chloride, 3,6-dimethyl-3-(n-nonyl)-6-phenyltetrahydro-1,3-oxazinium chloride, and 3,6-dimethyl-3-(n-decyl)-6-phenyltetrahydro-1,3-oxazinium chloride, respectively.

EXAMPLE 2

3,6-Dimethyl-3-(n-decyl)-6-phenyl tetrahydro-1,3-oxazinium bromide 3.7 G. (0.019 m.) of 3,6-dimethyl-6-phenyl tetrahydro-1,3-oxazine, 10 g. (0.045 m.) of n-decyl bromide and 50 ml. of acetone are combined and heated to reflux for 16 hours. After standing at 20°C. for 3 hours, crystallization occurs. The product is obtained by filtration and the 3,6-dimethyl-3-(n-decyl)-6-phenyl tetrahydro-1,3-oxazinium bromide is purified by recrystallization from 130 ml. of acetone. 2.5 G. of the pure material is recovered which melts at 194°-195.5°C.

In a similar manner as above, utilizing n-dodecyl bromide and the same reaction conditions, 3,6-dimethyl-3-(n-dodecyl)-6-phenyltetrahydro-1,3-oxazinium bromide melting at 190°-191.5°C. is obtained after recrystallization from 70 ml. of acetone.

When in the above procedure 3,6-dimethyl-6-(p-tolyl)-tetrahydro-1,3-oxazine, 3,6-dimethyl-6-(p-chlorophenyl)tetrahydro-1,3-oxazine, 3,6-dimethyl-6-(p-nitrophenyl)tetrahydro-1,3-oxazine or 3,6-dimethyl-6-(p-anisyl)-tetrahydro-1,3-oxazine is employed in place of 3,6-dimethyl-6-phenyltetrahydro-1,3-oxazine there is obtained 3,6-dimethyl-3-(n-decyl)-6-(p-tolyl)-tetrahydro-1,3-oxazinium bromide, 3,6-dimethyl-3-(n-decyl)-6-(p-chlorophenyl)-tetrahydro-1,3-oxazinium bromide, 3,6-dimethyl-3-(n-decyl)-6-(p-nitrophenyl)-tetrahydro-1,3-oxazinium bromide and 3,6-dimethyl-3-(n-decyl)-6-(p-anisyl)tetrahydro-1,3-oxazinium bromide, respectively.

EXAMPLE 3

3,6-Dimethyl-3-(2-ethyl-1-hexyl)-6-phenyltetrahydro-1,3oxazinium bromide 3.7 G. (0.019 m.) of 3,6-dimethyl-6-phenyl-tetrahydro-1,3-oxazine is combined with 10 ml. of acetone and 9.65 g. (0.05 m.) of 2-ethyl-1-hexyl bromide and heated to reflux for 6 hours. After standing overnight at 20°C., the reaction mixture is filtered and the product recovered is washed with cold acetone and diethyl ether. Pure 3,6-dimethyl-3-(2-ethyl-1-hexyl)-6-phenyltetrahydrooxazinium bromide is recrystallized from 60 ml. of acetone and melts at 183°-184.5°C.

When in the above procedure 3-ethyl-6-methyl-6-phenyltetrahydro-1,3-oxazine, 3-methyl-6-ethyl-6-phenyltetrahydro-1,3-oxazine or 3-(n-butyl)-6-methyl-6-phenyltetrahydro-1,3-oxazine is employed in place of 3,6-dimethyl-6-phenyltetrahydro-1,3oxazine, there is obtained 3-ethyl-6-methyl-6-phenyl-3-(2-ethyl-1-hexyl)tetrahydro-1,3-oxazinium bromide, 3-methyl-6-ethyl-6-phenyl-3-(2-ethyl-1-hexyl)tetrahydro-1,3-oxazinium bromide, and 3-butyl-6-methyl-6-phenyl-3-(2-ethyl-1-hexyl)tetrahydro-1,3-oxazinium bromide.

EXAMPLE 4

3,6-Dimethyl-3-(n-decyl)-6-phenyltetrahydro-1,3-oxazinium saccharinate 1.0 G. (0.0024 m.) of 3,6-dimethyl-3-(n-decyl)-6-phenyltetrahydro-1,3-oxazinium bromide is suspended in 100 ml. of distilled water at 20°C. To this suspension is added a solution of 3.0 g. (0.0125 ml.) of sodium saccharinate in 10 ml. of water. After 15 minutes a colorless oil separates and the reaction mixture is stirred for 4 hours at 20°C. The supernatant aqueous layer is decanted and the residual oil triturated twice with 15 ml. volumes of cold water. The oil is dried in a vacuum dessicator with potassium hydroxide pellets during which time the oil solidifies to a colorless mass. The product is recrystallized from 1.5 ml. of acetonitrile and precipitated with 9 ml. of diethyl ether. Pure 3,6-dimethyl-3-(n-decyl)-6-phenyltetrahydro-1,3-oxazinium saccharinate melts at 115°-116°C.

When in the above procedure sodium hydroxide, sodium nitrate, potassium sulfate, calcium phosphate or sodium borate is employed in place of sodium saccharinate there is obtained 3,6-dimethyl-3-(n-decyl)-6-phenyltetrahydro-1,3-oxazinium hydroxide, 3,6-dimethyl-3-(n-decyl)-6-phenyltetrahydro-1,3-oxazinium nitrate, 3,6-dimethyl-3-(n-decyl)-6-phenyltetrahydro-1,3-oxazinium sulfate, 3,6-dimethyl-3-(n-decyl)-6-phenyltetrahydro-1,3-oxazinium borate, respectively.

EXAMPLE 5

6-(4-Benzylphenyl)-3,6-dimethyl-3-(n-dodecyl)-tetrahydro-1,3-oxazinium saccharinate 2.7 G. (0.005 m.) of 6-(4-benzylphenyl)-3,6-dimethyl-3-(n-dodecyl)tetrahydro-1,3-oxazinium bromide is added to 200 ml. of distilled water at 20°C. 2.8 G. (0.02 m.) of sodium saccharinate dissolved in 10 ml. of water is added thereto. After stirring at 20°C. for 15 minutes a gelatinous precipitate is formed, after which the reaction mixture is stirred for 6 hours. The precipitate is allowed to settle and the separated liquid is decanted. The gummy residue is washed twice with 25 ml. portions of ice water. The residue is vacuum dried and recrystallized by fractional crystallization from acetonitrile and ether.

When in the above procedure sodium acetate, sodium propionate and sodium butyrate are employed in place of sodium saccharinate there is obtained 6-(4-benzylphenyl)-3,6-dimethyl-3-(n-dodecyl)-tetrahydro-1,3-oxazinium acetate, 6-(4-benzylphenyl)-3,6-dimethyl-3-(n-dodecyl)tetrahydro-1,3-oxazinium propionate, and 6-(4-benzylphenyl)-3,6-dimethyl-3-(n-dodecyl)-tetrahydro-1,3-oxazinium butyrate, respectively.

EXAMPLE 6

3-(n-decyl)-3,6-dimethyl-6-phenyltetrahydro-1,3-oxazinium lauryl sulfate 1.6 G. (0.04 m.) of 3-(n-decyl)-3,6-dimethyl-6-phenyltetrahydro-1,3-oxazinium bromide and 1.1 g. (0.038 m.) of sodium lauryl sulfate are combined in 50 ml. of acetonitrile and heated to reflux for 24 hours. The acetonitrile is removed by distillation in vacuo and the residue which contains the lauryl sulfate of the oxazine and sodium bromide is triturated with 5 ml. of cold water. The 3-(n-decyl)-3,6-dimethyl-6-phenyltetrahydro-1,3-oxazinium lauryl sulfate is purified by recrystallization from isopropanol.

When in the above procedure sodium laurylethersulfate, potassium laurylacid phosphate or potassium dodecylbenzenesulfonate is employed in place of sodium-laurylsulfate, there is obtained 3-(n-decyl)-3,6-dimethyl-6-phenyltetrahydro-1,3-oxaziniumlaurylethersulfate, 3-(n-decyl)-3,6-dimethyl-6-phenyltetrahydro-1,3-oxaziniumlaurylacidphosphate, and 3-(n-decyl)-3,6-dimethyl-6-phenyltetrahydro-1,3-oxazinium dodecylbenzenesulfonate, respectively.

EXAMPLE 7

3,6-Dimethyl-3-(n-dodecyl)-6-(4-isopropylphenyl)tetrahydro1,3-oxazinium bromide 4.6 G. (0.02 m.) of 3,6-dimethyl-6-(4-isopropyl)-tetrahydro-1,3-oxazine and 12 g. (0.05 m.) of n-dodecyl-bromide are combined in 50 ml. of acetone and refluxed for 12 hours. Half of the acetone is removed by distillation and the remaining concentrated solution cooled to 15°C. for several hours. The crude product is filtered and recrystallized from acetone to afford pure 3,6-dimethyl-3-(n-dodecyl)-6-(4-isopropylphenyl)tetrahydro-1,3-oxazinium bromide.

When in the above procedure there is employed 6-(4-benzylphenyl)-3,6-dimethyltetrahydro-1,3-oxazine, 6-(4-biphenylyl)-3,6-dimethyltetrahydro-1,3-oxazine in place of 3,6-dimethyl-6-(4-isopropylphenyl)tetrahydro-1,3-oxazine, there is obtained 6-(4-benzylphenyl)-3,6-dimethyl-3-(n-dodecyl)tetrahydro-1,3-oxazinium bromide and 6-(4-biphenylyl)-3,6-dimethyl-3-(n-dodecyl)tetrahydro-1,3-oxazinium bromide, respectively.

EXAMPLE 8

3-(n-Decyl)-3-ethyl-6-methyl-6-phenyltetrahydro-1,3-oxazinium bromide 4.1 G. (0.02 m.) of 3-ethyl-6-methyl-6-phenyltetrahydro-1,3-oxazine and 10 g. (0.045 m.) of n-decyl bromide are combined in 50 ml. of acetone and heated to reflux for 16 hours. After cooling to 20°C., 10 cc. of ether is added and the solid which precipitates is allowed to crystallize for 3 hours and removed by filtration. The solid is washed with cold acetone and dried. Recrystallization from acetone affords pure 3-(n-decyl)-3-ethyl-6-methyl-6-phenyltetrahydro-1,3-oxazinium bromide.

3-(n-Decyl)-3-ethyl-6-methyl-6-phenyltetrahydro-1,3-oxazinium bromide is also obtained by heating at reflux temperature 6.3 g. (0.02 m.) of 3-(n-decyl)-6-methly-6-phenyltetrahydro-1,3-oxazine and 4.9 g. (0.045 m.) of ethyl bromide in 50 ml. of acetone for 24 hours.

EXAMPLE 9

6,6-Diphenyl-3-methyl-3-(n-decyl)tetrahydro-1,3-oxazinium bromide 2.5 G. (0.01 m.) of 6,6-diphenyl-3-methyltetrahydro-1,3-oxazine is dissolved in 10 ml. of acetone to which is added 5 g. (0.02 m.) of n-decyl bromide and the resultant solution heated at reflux temperature for 16 hours. Upon removal of the solvent in vacuo and trituration of the residue with diethyl ether to remove the excess n-decyl bromide and drying under reduced pressure, crystalline 6,6-diphenyl-3-methyl-3-(n-decyl)tetrahydro-1,3-oxazinium bromide, results. Purification is affected by recrystallization from a small volume of acetone.

EXAMPLE 10

3,6-dimethyl-3-benzyl-6-phenyl-1,3-oxazinium iodide 3.0 G. (0.01 m.) of 6-methyl-3-benzyl-6-phenyl-1,3-oxazine and 2.8 g. (0.02 m.) of methyliodide are combined in 50 ml. of chloroform and heated to reflux for 3 hours. Upon cooling to 10°C. the product precipitates spontaneously and is removed by suction filtration. The solid material is washed with a small amount of cold chloroform and recrystallized from acetone to afford pure 3,6-dimethyl-3-benzyl-6-phenyl-1,3-oxazinium iodide.

The starting materials for the aforementioned examples may be prepared by the following procedures:

PREPARATION 1

3-ethyl-6-methyl-6-phenyltetrahydro-1,3-oxazine

A mixture of 80 g. (0.73 m.) of ethylaminehydrochloride, 220 g. (2.7 m.) of 37% aqueous formaldehyde solution and 118 g. (1.0 m.) of α-methylstyrene is stirred and heated at reflux temperature for 4 hours. The reaction mixture is cooled to room temperature and extracted with toluene. The aqueous layer is made alkaline with 30% sodium hydroxide solution and the basic organic material precipitates. The basic solution is extracted with toluene and the toluene evaporated in vacuo. The residue is distilled at 10 mm. of Hg, collecting the fraction boiling between 145° and 187°C. Analysis shows it to consist largely of 3-ethyl-6-methyl-6-phenyltetrahydro-1,3-oxazine with a small amount of phenylbutenylethylamine as an inpurity.

PREPARATION 2

6,6-diphenyl-3-methyltetrahydro-1,3-oxazine 4.8 g. (0.02 m.) of 6,6-tetrahydro-1,3-oxazine and 8.5 g. (0.06 m.) of methyliodide in 25 ml. of chloroform is heated at reflux temperature for 24 hours. The solvent and excess methyliodide are removed by distillation in vacuo and the residue made alkaline with cold 10% aqueous sodium hydroxide. The basic solution is extracted with ether and the ether solution washed with a small volume of cold water. Upon drying with anhydrous magnesiumsulfate the ether solution is evaporated to dryness and the oily residue recovered which is 6,6-diphenyl-3-methyltetrahydro-1,3-oxazine, and requires no further purification.

What is claimed is:

1. A compound of the formula:

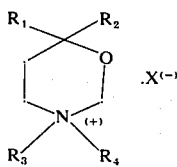

wherein $R_1$ is benzyl, phenyl or phenyl substituted by one loweralkyl, halo, loweralkoxy or nitro group, $R_2$ is loweralkyl or phenyl, $R_3$ is loweralkyl, $R_4$ is an alkyl group having 8–12 carbon atoms, and X is an anionic radical from the group consisting of halogen, an alkyl sulfate containing from 1–18 carbon atoms and saccharinate.

2. A compound of the formula:

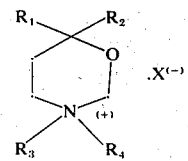

wherein $R_1$ is phenyl or phenyl substituted by one loweralkyl, halo, loweralkoxy, benzyl or nitro group, $R_2$ is loweralkyl or phenyl, $R_3$ is loweralkyl, $R_4$ is an alkyl group having 8–20 carbon atoms and X is an anionic radical from the group consisting of halogen, an alkoxy loweralkyl sulfate having an alkoxy group of from 8–20 carbon atoms, and saccharinate.

3. A compound as defined in claim 2 in which $R_1$ is phenyl, $R_2$ is loweralkyl, $R_3$ is alkyl of from 9 to 12 carbon atoms, $R_4$ is methyl or ethyl and X is chlorine or bromine.

4. A compound as defined in claim 2 which is 3,6-dimethyl-3-(n-decyl)-6-phenyltetrahydro-1,3-oxazinium bromide.

5. A compound as defined in claim 2 which is 3,6-dimethyl-3-(n-octyl)-6-phenyltetrahydro-1,3-oxazinium bromide.

6. A compound as defined in claim 2 which is 3,6-dimethyl-3-(n-dodecyl)-6-phenyltetrahydro-1,3-oxazinium bromide.

* * * * *